July 26, 1932.  C. L. HANEL  1,868,500
ELECTRICAL CIRCUIT CONTROLLING MECHANISM
Filed July 9, 1928  4 Sheets-Sheet 1

Inventor:
Charles L. Hanel
By Omar W. Kennedy
Attorney

July 26, 1932. C. L. HANEL 1,868,500
ELECTRICAL CIRCUIT CONTROLLING MECHANISM
Filed July 9, 1928 4 Sheets-Sheet 2

Inventor:
Charles L. Hanel
by Owen W. Kennedy
attorney

July 26, 1932.  C. L. HANEL  1,868,500
ELECTRICAL CIRCUIT CONTROLLING MECHANISM
Filed July 9, 1928  4 Sheets-Sheet 3

Inventor:
Charles L. Hanel
By Owen W. Kennedy
Attorney

July 26, 1932. C. L. HANEL 1,868,500
ELECTRICAL CIRCUIT CONTROLLING MECHANISM
Filed July 9, 1928 4 Sheets-Sheet 4

Inventor:
Charles L. Hanel
By Owen W. Kennedy
Attorney

Patented July 26, 1932

1,868,500

UNITED STATES PATENT OFFICE

CHARLES LUDWIG HANEL, OF JACKSON HEIGHTS, NEW YORK, ASSIGNOR TO SIGNAL ENGINEERING AND MANUFACTURING COMPANY, OF NEW YORK, N. Y., A CORPORATION OF MASSACHUSETTS

ELECTRICAL CIRCUIT CONTROLLING MECHANISM

Application filed July 9, 1928. Serial No. 291,441.

My invention relates to an improved electrical circuit controlling mechanism and has for its object to provide a device that will operate automatically in response to the passage of an electrical current therethrough to control a circuit in which the device itself forms a part, or to control a circuit external to the device.

Briefly stated, my mechanism operates on what might be termed an electro-mechanical principle in that it employs the longitudinal expansion and contraction of an electrical conductor due to the passage of an electric current therethrough to mechanically operate an improved device for making and breaking an electrical circuit. The mechanical make and break device embodies an actuating member so constructed that the circuit of the controlling and conducting element is made or broken with a very rapid movement, the actuating member also insuring adequate and sustained contact pressure, with a minimum of sparking. The above and other advantageous features of my invention will hereinafter more fully appear, reference being had to the accompanying drawings, in which—

Like reference characters refer to like parts in the different drawings.

Figures 1, 2, 3, 4, 5:
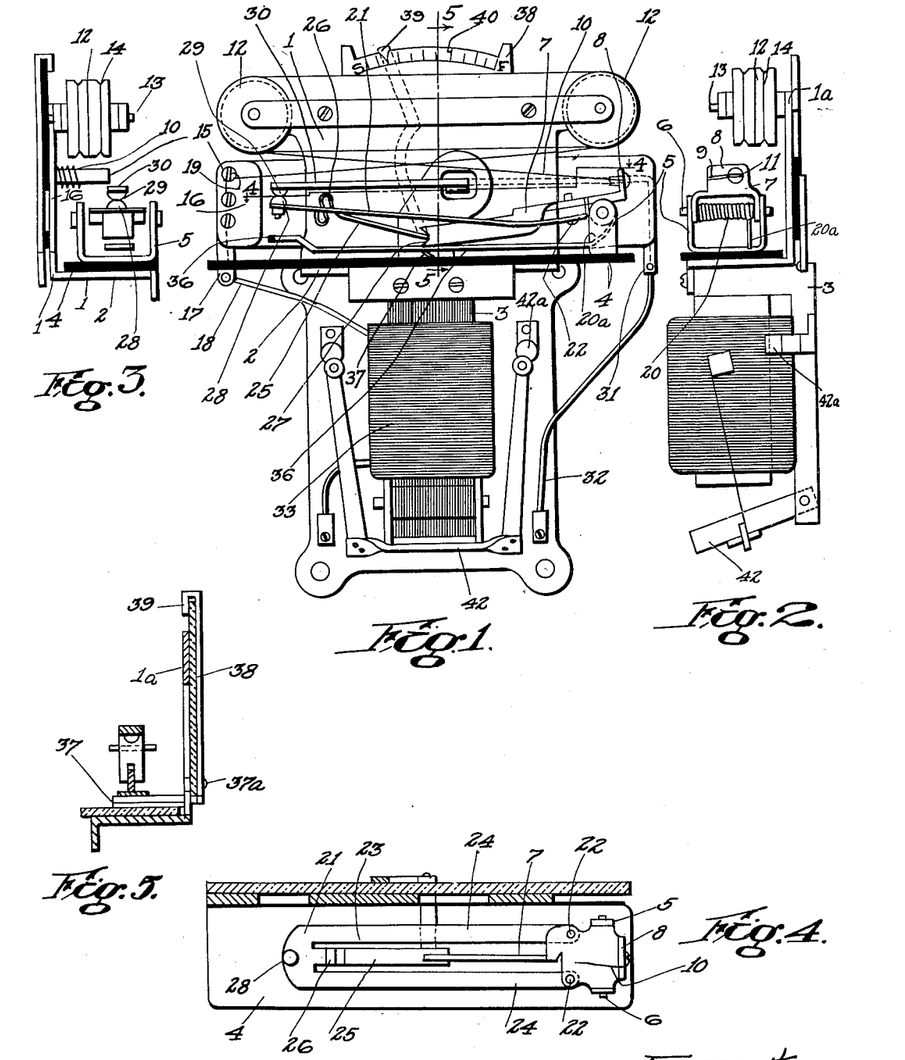
Fig. 1 is a view in front elevation of my improved circuit controlling mechanism applied, for purposes of illustration, to an electrical relay.
Fig. 2 is a view in side elevation of the parts shown in Fig. 1.
Fig. 3 is a view in end elevation of my improved mechanism removed from the relay.
Fig. 4 is a longitudinal sectional view along the line 4, 4 of Fig. 1 looking in the direction of the arrows.
Fig. 5 is a vertical sectional view along the line 5, 5 of Fig. 1 looking in the direction of the arrows.

Referring first to Figs. 1 and 2, the device consists of an L-shaped plate 1 providing a flange 2 whereby the plate may be readily attached to a suitable support such as the magnetic core 3 of a relay. The plate 1 carries a base of insulating material 4 upon which is mounted a U-shaped hinge bracket 5 carrying a pin 6 on which is pivotally supported a rocking lever 7. One end of the lever 7 provides a lug 8 adjacent to the pivot pin 6 and this lug 8 provides a slot 9 for receiving a wire or filament 10 held in the slot 9 by a screw 11.

The wire 10 passes from the lug 8 around loose pulleys 12, 12 freely mounted on shafts 13, 13 extending from the vertical portion 1a of the plate 1. Each shaft 13 supports two pulleys 12 although more may be provided if desired and each pulley 12 provides a groove 14 for receiving the wire 10. After passing around the second right hand pulley 12 the wire passes in the opposite direction to an anchor pin 15 carried by a plate 16. The anchor pin plate 16 is insulated from the base plate 1 as shown in Fig. 3 and the plate 16 further provides a terminal 17 by means of which current may be led to the anchor pin 15 and the wire 10 by means of a conductor 18.

The wire 10 is wrapped for the few turns about the anchor pin 15 and the end of the pin 15 provides a slot 19 whereby the anchor pin 15 may be turned to wind the wire 10 thereon. As previously pointed out, the other end of the wire 10 is secured to the lug 8 on the short arm of the lever 7 so that when the wire 10 is wound on the anchor pin 15, a tension can be placed on the wire 10 which will tend to turn the lever 7 about its pivotal axis in a counterclockwise direction. When the device is inoperative there is sufficient initial tension in the wire 10 to hold the lever 7 in the position shown in Fig. 1.

The shaft 6 is surrounded by a spring 20 one end of which is secured to the lever 7 while the other end presses against the base of the bracket 5 as indicated at 20a in Fig. 2. With the parts in position shown in Fig. 1 the spring 20 opposes the tension of the wire 10 so that should the wire 10 be loosened, for any cause, the spring 20 will then be free to turn the lever 7 on its axis in a clockwise direction. In other words, should the initial tension in the wire 10 be relieved, as by turning the anchor pin 15, or by expanding the wire 10, the spring 20 will immediately turn the lever 7 from the position shown diagrammatically in Fig. 6 to the position shown diagrammatically in Fig. 8.

The lever 7 also carries a resilient contact arm 21 which is secured to the lever 7 at points adjacent its pivot 6 by means of screws 22. The contact arm 21 is preferably formed from thin sheet metal and possesses considerable inherent resiliency. As shown in Fig. 4, the central portion of the arm 21 is cut away as shown at 23 leaving spaced fingers 24 with a tongue 25 therebetween, the fingers 24 and tongue 25 being joined together only at the extreme end portion of the arm opposite to the points of attachment of the fingers 24 to the lever 7 by the screws 22. In forming the arm 21, the tongue 25 is bent in a double loop as shown at 26 extending above and below the fingers 24, the remainder of the tongue 25 extending in the direction of the lever 7 where the end of it is received in a notch 27 provided in the end of the lever 7.

With the parts in the position shown in Figs. 1 and 6, the end of the tongue 25 received in the notch 27 is disposed considerably below the resilient fingers 24 so that the tongue 25 exerts an upward thrust on the whole contact arm 21. The free end of the arm 21 carries a contact 28 which is adapted to be held in engagement with a stationary contact 29 by the above described upward thrust exerted by the resilient tongue 25. The contact 29 is carried at the end of a conducting bar 30 insulated from the base plate 1 and ending in a terminal 31 by means of which current may be led to the contact 29 through a conductor 32.

Figure 6:
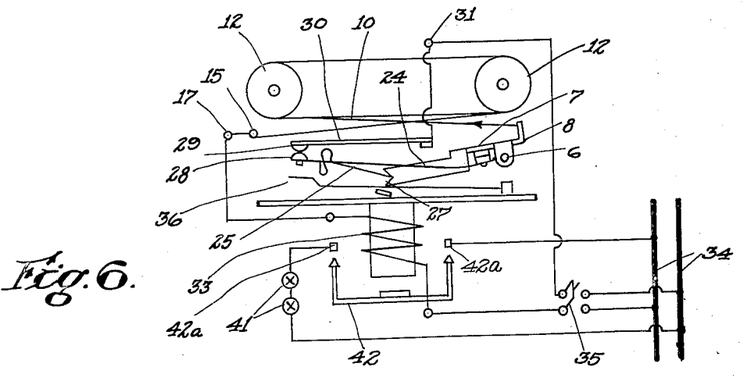
Figs. 6, 7 and 8 are diagrammatic views respectively illustrating my mechanism in an inoperative position, a circuit making position and in a circuit breaking position.

As best shown in Fig. 6, anchor pin terminal 17 is connected to one terminal of the winding or coil 33 of a relay which is adapted to be controlled by my circuit controlling mechanism. The terminal 31 for the stationary contact 29 is adapted to be directly connected to a source of electrical energy represented by the supply mains 34 through a suitable switch 35, shown open, and the other terminal of the relay winding 33 is also connected to this switch 35. With the parts as shown in Fig. 6, the relay winding 33 is not energized and no current is passing through the tensioned wire 10, although the contacts 28 and 29 are held closed. In this position the tension of the wire 10 maintains the lever 7 in the position shown, so that the resilient tongue 25 of the contact arm 21 maintains the contacts 28 and 29 in close engagement.

Figure 7:
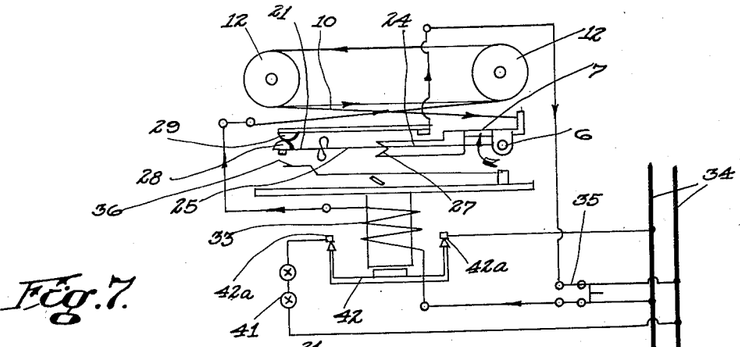

However, when the switch 35 is closed as shown in Fig. 7 current immediately flows from the relay winding 33 through the wire 10, the arm 7 and from thence through the closed contacts 28 and 29 back to the supply mains 34. As the current flows through the wire 10 as indicated by the arrows, it quickly heats up due to its high resistance and expands longitudinally. As this expansion takes place the coil spring 20 surrounding the pivot shaft 6 of the main lever 7 tends to turn the lever 7 in a clockwise direction, the first portion of this movement being shown in Fig. 7. At this time the contacts 28 and 29 are still in engagement and as a matter of fact during the first part of the upward movement of the lever 7 the tongue 25, due to the resiliency imparted by the loop 26, exerts a positive force tending to hold the contacts 28 and 29 in close engagement.

Figure 8:
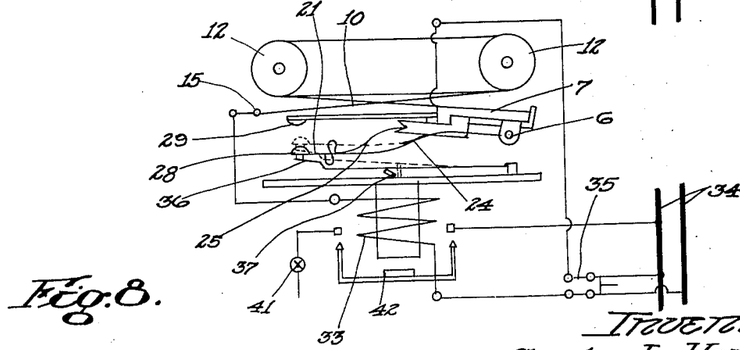

As shown in Fig. 7, the lever 7 has at that time moved upwardly to the point where the end of the tongue 25 in the lever notch 27 is almost in line with the pivot pin 6 and the contact 28 and it is obvious that further upward movement of the lever 7 by the spring 20 will throw the notch 27 above a line joining these points. As this occurs, the tongue 25 immediately exerts a thrust tending to separate the contacts 28 and 29 and also tending to assist the spring 20 in throwing the lever 7 upwardly. Consequently the lever 7 completes its upward movement very rapidly thereby separating the contacts 28 and 29 and moving the contact 28 into engagement with the end of the stop plate 36 as shown in Fig. 8. In this diagram, the new position of the lever 7 and the tongue 25 is shown very clearly and it is evident that the contact 28 will be held out of engagement with the stationary contact 29.

In the position of parts shown in Fig. 8 it is evident that the circuit through the relay winding 33 is broken at the contacts 28 and 29 so that current no longer flows through the wire 10. Therefore, the wire 10 immediately cools off and its resulting contraction re-establishes the tension in the wire 10 due to its initial setting. This contraction occurs very rapidly so that within a very short space of time after the separation of contacts 28 and 29 the circuit is re-established by the wire turning the main lever 7 about its axis into the position shown in Fig. 6. During this movement the notch 27 in the lever 7 describes a downward path and it is evident from Fig. 8 that the contact 28 will be rapidly thrown into engagement with the stationary contact 29 whenever the apex of the notch 27 crosses the line joining the pivot pin 6 with the end of the contact arm 21. When the contact 28 is thrown upwardly to again engage contact 29, the circuit through the wire 10 is re-established and the resulting flow of current again causes expansion of the wire 10 until the spring 20 again throws the arm 7 upwardly to break the circuit.

As previously pointed out it is one of the objects of my invention to insure sustained contact pressure between the contacts 28 and 29 until the separation of these contacts occurs, and the peculiar functioning of the resilient contact arm 21 to obtain this effect will now be described. It is quite apparent from Figs. 1 and 6 that the pressure between contacts 28 and 29 is due to the thrust of the resilient tongue 25 acting at an angle to the fingers 24 on either side thereof. Furthermore, it is apparent that when the contact 28 is held against the contact 29, the fingers 24 are flexed upwardly from their points of attachment to the lever. Consequently, the fingers 24 offer a certain resistance to the thrust of the tongue 25 and the tendency of the fingers 24 to straighten out would separate the contact 28 from contact 29 should the thrust of the tongue 25 be removed.

Now as the lever 7 is turned on its pivot in a clockwise direction, as shown in Fig. 7, the thrust exerted by tongue 25 is decreased and it is obvious that should the fingers 24 be anchored at fixed points relative to the lever 7, the contact pressure would decrease appreciably due to the tendency of the fingers 24 to straighten out. However, as previously pointed out, the fingers 24 are secured to the lever 7 by the screws 22, so that as the lever 7 turns the points of attachment of the fingers 24 move upwardly, until as shown in Fig. 7, there is no longer any flexure of the fingers 24. This relief of the flexure of the fingers 24 has the effect of overcoming any tendency of the contact 28 to leave the contact 29, as the thrust of the tongue 25 decreases. Therefore, adequate pressure is maintained between the contacts 28 and 29 up until the time that the lever 7 reaches the critical point shown in Fig. 7 where continued movement of the lever 7 will cause the tongue 25 to exert its thrust in the opposite direction to move the contact 28 into engagement with the stop 36, as shown in Fig. 8. In this position the fingers 24 are flexed downwardly, so that as the lever is next turned in a counter clockwise direction, the flexure is relieved before the throw over of the tongue 25, as previously described.

As the fingers 24 tend to straighten out with either direction of movement of the lever 7, the longitudinal thrust on the arm 21 causes the contact 28 to slide slightly on the stationary contact 29, which is advantageous from the standpoint of preventing arcing and wear on the contacts. The actual separation of the contacts takes place with a very quick action owing to the energy stored up in the loops 26 of the tongue 25, as the apex of the notch 27 moves towards the arms 24 and shortens the effective length of the tongue 25. This compresses the loops 26, so that when the lever 7 moves past the dead center, in either direction, the stored up energy in the loops 26 throws the arm 21 either up or down with a quick snap action.

With the above explanation of Figs. 6, 7 and 8 it is obvious that as long as the switch 35 remains closed the relay winding 33 will be intermittently energized and deenergized, the action being entirely automatic and repeating itself indefinitely, and without variation, so long as the initial setting of the parts remains the same.

It is however within the contemplation of my invention to vary the duration of the period in which the current does not flow and to this end the position of the stop plate 36 is made adjustable. As shown in Fig. 8 the plate 36 is maintained at a slight inclination from the horizontal by means of a bar 37, only the end of which is shown, and it is obvious that should this bar be turned about its longitudinal axis the inclination of the plate 36 will be changed. Should the end of the bar 36 be raised as shown in dotted lines in Fig. 8 it is apparent that the contact 28 can not be moved as far downwardly as shown in full lines and consequently the apex of the notch 27 will not have to move so far downwardly in order to swing across the dead center. Therefore with the stop plate 36 raised from the full line position of Fig. 8 the period of no current flow can be shortened as desired.

As best shown in Fig. 5 the bar 37 extends under the stop plate 36 to a point behind the upward extension 1a of the base plate 1, where the bar 37 is bent upwardly and is pivotally mounted on a pin 37a. The vertical portion of the bar extends behind an insulating panel 38 over the upper edge of which it is bent to form a pointer 39. As shown in Fig. 1 the pointer 39 is adapted to cooperate with scale markings 40 on the insulating panel 38. With these markings 40. the letter "S" indicates that the device will run slowly when the bar 37 and stop plate 36 are nearly horizontal. As the pointer 39 is moved towards the letter "F" the bar 36 will be raised to limit the downward throw of the contact arm 21 so that the device will run faster as regards the interruptions of the circuit.

As an illustrative embodiment of the utility of my mechanism, the relay shown in Fig. 6 is adapted to control the energization of a number of lights or signal devices 41. The signal devices 41 are permanently connected to one of the supply mains 34 and are adapted to be connected to the other main 34 through a circuit which is completed when the armature 42 of the relay is raised to engage stationary contacts 42a. With visual or audible signals so controlled it is obvious that recurrent signaling can be carried on indefinitely and entirely automatically with a considerable variation in the intervals between the giving of the signals, the interval remaining the same for a given setting of the mechanism.

Figure 9:
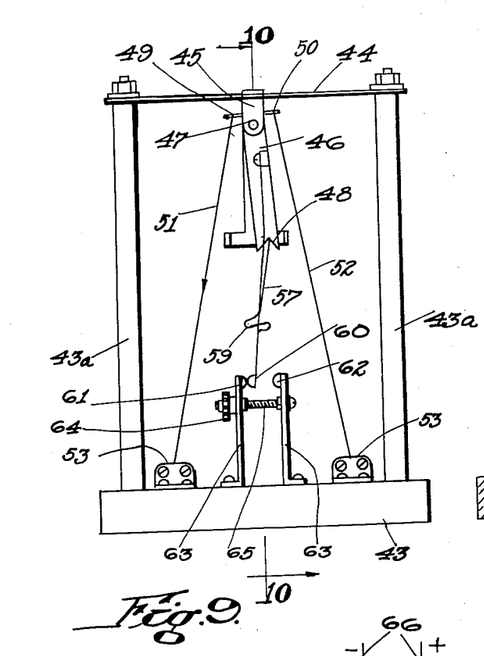
Fig. 9 is a view in side elevation of a modified form of circuit controlling device.
Figure 10:
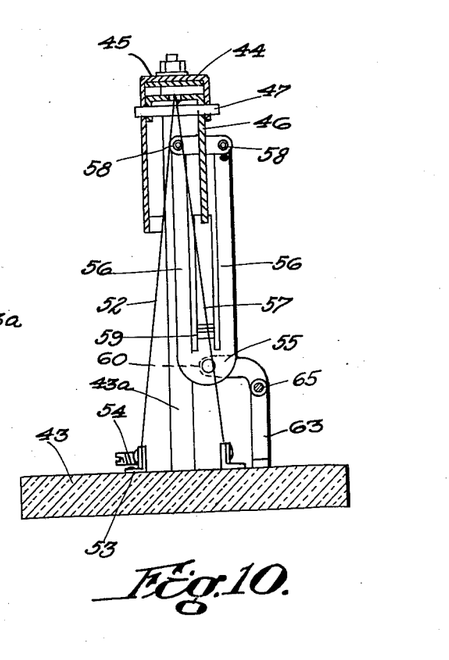
Fig. 10 is a view in side elevation of the device shown in Fig. 9.
Figure 11:
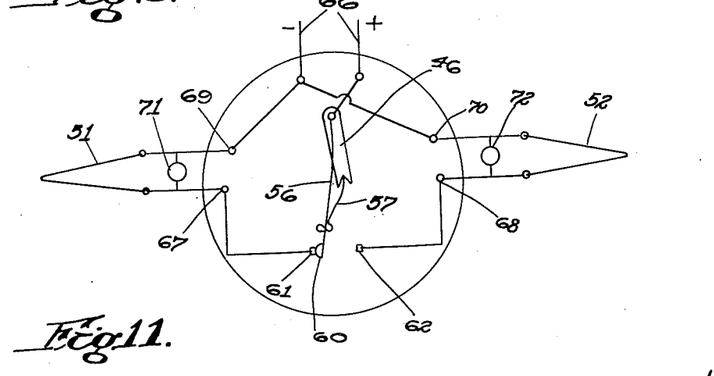
Fig. 11 is a diagrammatic view of the circuit connections for the device of Fig. 9.

Referring now to Figs. 9, 10 and 11 there is shown a modification of my device in which the thermo conducting element is utilized to maintain the circuit controller in either one or two different circuit controlling positions. The modified device comprises a base 43 from which extend vertical supports 43a carrying a cross member 44. The cross member 44 is made light enough so that it possesses considerable inherent resiliency and carries at its middle a downwardly extending U-shaped bracket 45. A rocking lever 46 somewhat similar to the lever 7 is pivotally mounted between the arms of the bracket 45 on a pin 47, the lever 46 extending downwardly and providing at its end a notch 48.

The upper end of the lever 46 provides oppositely extending lugs 49 and 50 and wires or filaments 51 and 52 pass through holes in the lugs 49 and 50 respectively. Each wire 51 and 52 is in the form of a loop with its ends secured in clamps 53 carried by the base 43. The clamps 53 are arranged in spaced pairs and one clamp of each pair provides an anchor pin 54 around which a portion of the corresponding wire is wrapped so that the tension of each wire 51 or 52 can be adjusted through turning a pin 54.

The rocking lever 46 carries a resilient contact arm 55 similar to the contact arm 21. The arm 55 is preferably formed from thin sheet metal so as to be resilient, the central portion being cut away to leave spaced fingers 56 with a tongue 57 therebetween. The arms 56 are secured to the lever 46 by screws 58 while the free end of the tongue 57 is received in the notch 48 of the lever, the tongue 57 providing a double loop 59 which functions in the same manner as does the double loop 26 on the contact arm 21. The closed end of the arm 55 carries a contact 60 which, in the position shown in Fig. 9, is maintained in engagement with a stationary contact 61 by the tension in the tongue 57, the lever 46 in this position being turned slightly from the vertical so that the wire 52 is also under a considerable tension.

A second stationary contact 62 is mounted opposite to the contact 61, the contacts 61 and 62 being carried on upwardly extending arms 63 secured to the base 43. The distance between contacts 61 and 62 can be adjusted by means of a thumb nut 64 in threaded engagement with a bolt 65 extending between the arms 63.

The circuit arrangement of the device of Fig. 9 is shown in Fig. 11 wherein the lever 46 and with it the contact arm 55 is connected to one side of a suitable source of power at 66. The stationary contacts 61 and 62 are connected to terminals 67 and 68 while the other side of the source 66 is connected to terminals 69 and 70. The wire 51 is connected across the terminals 67 and 69 while the wire 52 is connected across the terminals 68 and 70. Signal devices 71 and 72, such as incandescent lamps or bells, are also connected across the terminals 67 and 69 and 68 and 70 respectively, in parallel with the wires 51 and 52.

With the parts in the position shown in Figs. 9 and 11 it is apparent that current will flow from the contact 60 to the contact 61 to energize the signal devices 71 and at the same time will flow in parallel through the wire 51. When this occurs, the expansion of the wire 51 due to the passage of the current permits the tension in the other cold wire 52 to turn the lever 46 about its pivot 47 in a clockwise direction. As the notch 48 in the lever 46 swings past the central axis of the device the thrust of the tongue 57 snaps the contact 60 into engagement with the contact 62 thereby deenergizing the signal devices 71 and the wire loop 51. This new contact energizes the devices 72 and the wire loop 52 and the resulting expansion of the latter permits the contracting cold wire 51 to again turn the lever 46 into the position of Fig. 9.

Obviously with the above described arrangement the lever 46 will be swung back and forth so long as the device is energized thereby causing intermittent flashing of the lamps 71 and 72, or intermittent energization of any other devices that may be in the control circuits. The period of oscillation of the lever 46 can be varied by adjusting the distance between the stationary contacts 61 and 62 by means of the thumb nut 64 coacting with the screw 65. Turning the nut 64 in to draw the contacts 61 and 62 closer together decreases the time required for a cooling wire to throw the lever 46, and thus the period that each lamp or signal device 71 or 72 is energized is decreased.

Figures 12, 14:
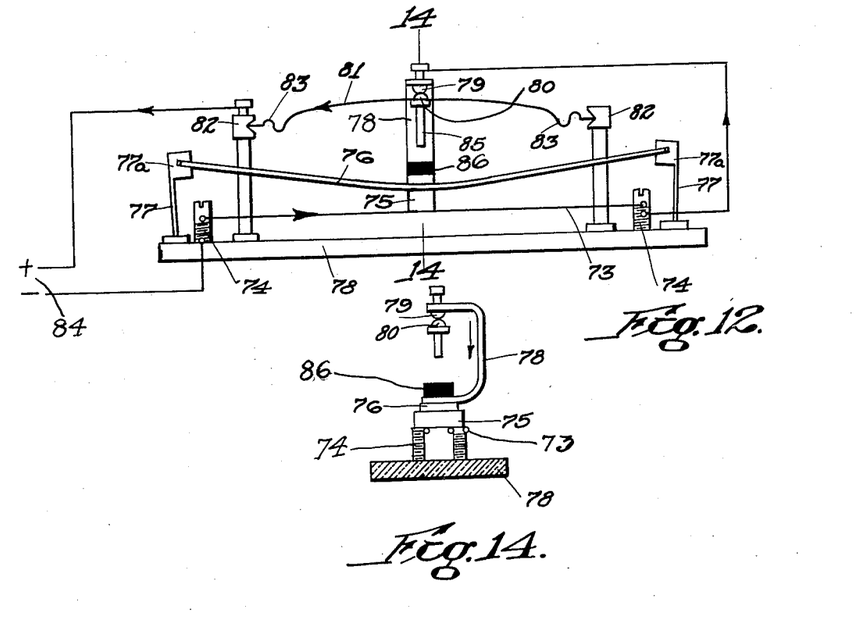
Fig. 12 is a view in side elevation of a further modification.
Fig. 14 is a sectional view along the line 14—14 of Fig. 12.
Figure 13:
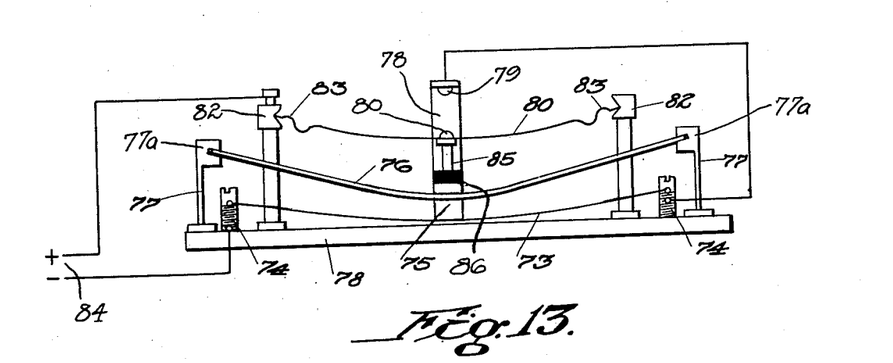
Fig. 13 is a view showing the device of Fig. 12 in a different position.

Referring now to Figs. 12, 13 and 14, there is shown a further modification of my device, wherein the longitudinal expansion of the current carrying filament is employed to effect the movement of a circuit controlling member in a direction at right angles to the axis of the filament, as distinguished from the previously described constructions, wherein the movement of the filament in the direction of its axis is employed. In the modification shown in Fig. 12, a filament 73, of one or more strands, is secured at its ends to anchor posts 74, one post 74 being turnable so as to control the tension of the filament 73, which has several turns wrapped around the adjusting post 74. Normally, the adjustment of the filament 73 is such that when the filament is in a cold condition, with no current flowing therethrough, there is sufficient tension in the filament 73 so that it extends in a substantially horizontal plane between the anchor posts 74, as shown in Fig. 12. The middle portion of the filament 73 has in engagement therewith a block 75, carried by a resilient member 76, the ends of which are received in notched heads 77a provided by arms 77 extending above the base 78 which carries the anchor posts 74. The resilient member 76 is flexed between the heads 77a, so that the block 75 bears upon the taut filament 73 with a pressure which however is not enough to bend the filament 73 downwardly.

The flexed member 76 carries a yoke 78 extending upwardly in the form of a U and carrying at its upper end a contact 79 which bears on a contact 80 carried by a spring contact plate 81. The contact plate 81 is arched upwardly and is received at its ends in notches provided in stationary standards 82 extending upwardly from the base 78. The contact plate 81 provides near its end loop portions 83 which, being under compression, tend to maintain the contact 80 in engagement with the contact 79 in the position shown in Fig. 12.

Current is adapted to be led to one anchor post 74, from which it passes through the filament 73 to the other anchor post 74 and from there to the contact 79 on the yoke 78. With the contacts 79 and 80 in engagement as shown in Fig. 12, current will flow through the plate 81 to one standard 82, and from there back to the source 84. When current flows as indicated by the arrows in Fig. 12, the filament 73 heats up, due to the passage of the current, and the resulting elongation thereof causes the filament 73 to sag, as indicated in Fig. 13. When this occurs, the block 75, carried by the member 76, follows the filament 73, due to the initial flexure of the member 76, the yoke 78 moving downwardly with the member 76 as the filament 73 sags downwardly. As previously pointed out, the contact plate 81 is arched upwardly, and it is apparent from Fig. 12 that when the downward movement of contact 79 carries the contact 80 below a line joining the ends of the contact plate 81, the plate 81 will be suddenly snapped to the position shown in Fig. 13 to separate the contacts 79 and 80. The plate 81 is then arched downwardly and its downward position is limited by the engagement of a pin 85 carried thereby with a stop 86 carried by the spring member 76, the stop 86 being preferably made of insulating material.

When the contact plate 81 is snapped from the position shown in Fig. 12 to the position shown in Fig. 13, the disengagement of the contacts 79 and 80 interrupts the flow of current through the filament 73, whereupon the latter contracts as it cools off until it again assumes the position shown in Fig. 12. The resulting upward movement at the center of the spring member 76 causes the stop 86 to raise the pin 85 until the contact 80 moves above the line joining the ends of the contact plate 81, whereupon the contact plate 81 is snapped to its upper position, to cause the contact 80 to re-engage the contact 79.

It is obvious that as long as current is supplied to the device from the source 84, the intermittent expansion and contraction of the filament 73 will cause the contacts 79 and 80 to be alternately engaged and disengaged just as in the other embodiments of my invention previously described. The device shown in Figs. 12 and 13 inclusive is extremely sensitive in its operation, by reason of the fact that a very slight elongation of the filament 73 due to passage of current, will result in separation of the contacts 79 and 80. Furthermore, the device is very reliable in its operation, since the filament 73 itself does not have to develop any mechanical force to operate the contact carrying plate 81, the energy stored up in the spring member 76, by reason of its initial flexure, being sufficient to operate the contact carrying yoke 78.

I claim:

1. In a device of the class described, a pivotally mounted member carrying a contact arm having a yieldable portion deflected from the plane of the arm by said pivoted member to exert a force on the free end of the arm tending to maintain it in a predetermined position.

2. In a device of the class described, a rigid pivotally mounted member carrying a flexible arm having a portion thereof cut away to provide a compressible tongue extending from the free end of the arm and terminating at a point substantially equidistant from the pivotal axis of the rigid member and said arm's free end.

3. In a device of the class described, a rigid pivotally mounted member carrying a flexible arm having a portion thereof cut away to provide a compressible tongue and means acting through said pivoted member for deflecting the free end of said tongue away from the remainder of the arm, whereby said tongue exerts a force tending to maintain the free end of said arm against a fixed stop.

4. In a device of the class described, the combination with a pair of fixed stops and a member pivotally mounted on an axis displaced from said stops, of a resilient arm providing one portion connected to said pivoted member adjacent to its axis and another portion extending at an angle to first portion with its end in engagement with the free end of said pivoted member whereby to maintain the end of said arm in contact with one of said stops.

5. In a device of the class described, the combination with a pair of fixed stops and a member pivotally mounted on an axis displaced from said stops, of a resilient arm providing one portion connected to said pivoted member adjacent to its axis and another compressible portion extending at an angle to first portion with its free end in engagement with the free end of said pivoted member, turning of said pivoted member in one direction being adapted to swing the free end of said arm in the opposite direction, from one of said stops to the other after the said member has turned through a predetermined angle.

6. In a device of the class described, the combination with a pair of fixed stops and a member pivotally mounted on an axis displaced from said stops, of a resilient arm providing one portion connected to said pivoted member adjacent to its axis and another compressible portion extending at an angle to first portion with its free end in engagement with the free end of said pivoted member, turning of said pivoted member in one direction causing said compressible arm portion to snap the free end of said arm in the opposite direction, to engage one or the other of said stops.

7. In an electrical circuit controlling device, a stationary contact, a pivotally mounted member carrying a flexible contact arm, and a filamentary electrical conductor having one end fixed and the other end connected to said pivoted member to cause it to maintain the free end of said contact arm in engagement with said stationary contact, passage of current through said conductor in series with said arm causing the expansion of said conductor and the turning of said pivoted member to flex said contact arm away from said stationary contact.

8. In an electrical circuit controlling device, a stationary contact, a pivotally mounted member carrying a flexible contact arm, and a filamentary electrical conductor having one end fixed and the other end connected to said pivoted member to cause it to maintain the free end of said contact arm in engagement with said stationary contact, passage of current through said conductor in series with said arm causing the expansion of said conductor and the turning of said pivoted member to flex said contact arm away from said stationary contact after current has passed through said filamentary conductor for a predetermined period.

9. In a device of the class described, a fixed contact and a pivotally mounted member carrying a contact arm having a yieldable portion deflected from the remainder of said arm by the said pivoted member to exert a force on the free end of the contact arm tending to maintain it in close engagement with said fixed contact.

10. In a device of the class described, a fixed contact and a pivotally mounted member carrying a contact arm having a yieldable portion deflected from the remainder of said arm by the said pivoted member to exert a force on the free end of the contact arm tending to maintain it in close engagement with said fixed contact, turning of said member about its pivot causing the free end of said arm to shift on said contact without decreasing the pressure therebetween.

11. In a device of the class described, a pair of spaced stops, a pivotally mounted member carrying a flexible arm having a portion thereof cut away to provide a compressible tongue extending from the free end of said arm in the direction of its pivot and means provided by said pivoted member for moving the end of said tongue about the axis of said member to cause said tongue to throw the free end of said arm from one of said stops to the other in a direction opposite to that in which the end of said tongue is moving.

12. In a device of the class described, a pair of spaced stops and a pivotally mounted member carrying a resilient arm formed in two parts, one portion of said arm being secured to said member near its pivotal axis and the other part of said arm being in engagement with the free end of said pivoted member, whereby turning movement of said member about its axis through a predetermined angle causes the free end of said arm to be moved from one of said stops to the other in a direction opposite to that in which the end of said pivoted member is moving.

13. In a device of the class described, the combination with a stationary contact, a pivotally mounted member and a flexible contact arm carried by said member with one end in engagement with said stationary contact and with a deflected portion in engagement with the free end of said member, of means for turning said member about its pivotal axis whereby the movement of its free end acting through said contact arm maintains the pressure between said contact arm and said stationary contact.

14. In a device of the class described, the combination with a stationary contact, a pivotally mounted member and a flexible contact arm carried by said member with one end in engagement with said stationary contact and with a deflected portion in engagement with the free end of said member, of means for turning said member about its pivotal axis to carry the deflected portion of said contact arm from a position in which it exerts a force tending to hold the end of said arm in engagement with said contact, to a position in which it exerts a force tending to separate said contact arm from said contact.

15. In an electrical circuit controlling device, a stationary contact, a stationary stop spaced from said contact, a pivotally mounted member carrying a flexible contact arm and a filamentary electrical conductor having one end fixed and the other end connected to said pivoted member to cause it to maintain the free end of said arm in engagement with said stationary contact, the passage of electrical current through said conductor in series with said arm causing the heating and expansion of said conductor to permit the turning of said pivoted member to flex said contact arm away from said stationary contact into engagement with said stop and the cooling and contraction of said conductor, after the separation of the arm and contact, causing the pivoted member to turn and flex said contact arm away from said stop to reengage said contact.

16. In an electrical circuit controlling device, a stationary contact, a stationary stop spaced from said contact, a pivotally mounted member carrying a flexible contact arm and a filamentary electrical conductor having one end fixed and the other end connected to said pivoted member to cause it to maintain the free end of said arm in engagement with said stationary contact, the passage of electrical current through said conductor for a predetermined period in series with said arm causing the heating and expansion of said conductor to permit the turning of said pivoted member to flex said contact arm away from said stationary contact into engagement with said stop, and the cooling and contraction of said conductor following the separation of said arm and contact causing said pivoted member to turn and flex said contact arm away from said stop to reengage said contact.

17. In an electrical circuit controlling device, a stationary contact, a stationary stop spaced from said contact, a pivotally mounted member carrying a flexible contact arm and a filamentary electrical conductor having one end fixed and the other end connected to said pivoted member to cause it to maintain the free end of said arm in engagement with said stationary contact, the passage of electrical current through said conductor for a predetermined period in series with said arm causing the heating and expansion of said conductor to permit the turning of said pivoted member to flex said contact arm away from said stationary contact into engagement with said stop, and the cooling and contraction of said conductor following the separation of said arm and contact causing said pivoted member to turn and flex said contact arm away from said stop to reengage said contact, the period during which said arm engages either said contact or said stop being determined by the spacing between said contact and said stop.

18. In an electrical circuit controlling device, the combination with a source of electrical energy, a stationary contact connected to one side of said source, and a pivotally mounted member carrying a flexible contact arm, of a filamentary electrical conductor having one fixed end connected to the other side of said source and its other end connected to said pivoted member, whereby when the free end of said contact arm is in engagement with said stationary contact passage of current through said conductor in series with said arm causes the heating and expansion of said conductor to permit the turning of said pivoted member to flex said contact arm away from said contact.

19. In an electrical circuit controlling device, the combination with a source of electrical energy, a stationary contact connected to one side of said source, and a pivotally mounted member carrying a flexible contact arm, of a filamentary electrical conductor having one fixed end connected to the other side of said source and its other end connected to said pivoted member, whereby when the free end of said contact arm is in engagement with said stationary contact passage of current through said conductor in series with said arm causes the heating and expansion of said conductor to permit the turning of said pivoted member to flex said contact arm away from said contact, and whereby cooling and contraction of said conductor causes said pivoted member to reengage said contact arm with said contact, intermittent movement of said contact arm continuing automatically while said stationary contact and said conductor remain connected to said source.

CHARLES LUDWIG HANEL.